United States Patent
Kim et al.

(10) Patent No.: US 12,540,136 B2
(45) Date of Patent: Feb. 3, 2026

(54) PYRROLOPYRIDINE DERIVATIVE AND USE THEREOF

(71) Applicant: ST PHARM CO., LTD., Gyeonggi-do (KR)

(72) Inventors: Kyungjin Kim, Seoul (KR); Uk-Il Kim, Gyeonggi-do (KR); Hyung Tae Bang, Gyeonggi-do (KR); Seul Ki Lee, Gyeonggi-do (KR); Si Yeon Han, Gyeonggi-do (KR)

(73) Assignee: ST PHARM CO., LTD., Gyeonggi-do (KR)

( * ) Notice: Subject to any disclaimer, the term of this patent is extended or adjusted under 35 U.S.C. 154(b) by 470 days.

(21) Appl. No.: 18/021,930

(22) PCT Filed: Aug. 20, 2021

(86) PCT No.: PCT/KR2021/011116
§ 371 (c)(1),
(2) Date: Feb. 17, 2023

(87) PCT Pub. No.: WO2022/039551
PCT Pub. Date: Feb. 24, 2022

(65) Prior Publication Data
US 2023/0373994 A1     Nov. 23, 2023

(30) Foreign Application Priority Data
Aug. 20, 2020 (KR) .................. 10-2020-0104758

(51) Int. Cl.
    *C07D 471/04*     (2006.01)
    *A61P 31/18*     (2006.01)

(52) U.S. Cl.
    CPC ............ *C07D 471/04* (2013.01); *A61P 31/18* (2018.01)

(58) Field of Classification Search
    CPC .................................................. C07D 471/04
    USPC ......................................................... 514/300
    See application file for complete search history.

(56) References Cited

U.S. PATENT DOCUMENTS

| 9,499,537 B2* | 11/2016 | Son ..................... A61P 31/12 |
| 2010/0179139 A1 | 7/2010 | Bamborough |
| 2014/0249162 A1 | 9/2014 | Son et al. |

FOREIGN PATENT DOCUMENTS

| EP | 2781519 A1 | 9/2014 | |
| JP | 2014522858 | 9/2014 | |
| KR | 20130054211 | 5/2013 | |
| KR | 2015141275 | * 6/2014 | |
| KR | 20150141275 | 12/2015 | |
| KR | 20190141152 | 12/2019 | |
| WO | WO 2005/103003 | 11/2005 | |
| WO | WO 2012/102985 | 8/2012 | |
| WO | WO 2013/012649 A1 | 1/2013 | |
| WO | 2018174320 | * 9/2018 | |
| WO | WO-2018174320 A1 * | 9/2018 | ........... A61K 31/437 |

OTHER PUBLICATIONS

Estevez et al., "Multicomponent reactions for the synthesis of pyrroles," *Chemical Society Reviews*, vol. 39, No. 11, p. 4402, Jan. 1, 2010.
Office Action for Brazilian Application No. BR112023003144-3, dated Feb. 25, 2025, with English-language machine translation.
International Search Report and Written Opinion from International Application No. PCT/KR2021/000301, issued on Oct. 1, 2021.
Supplementary European Search Report issued for European Application No. 21917801.9, dated Aug. 23, 2024, 11 pages.
Zanatta et al., "Convenient One-Pot Synthesis of N-Substituted 3-Trifluoroacetyl Pyrroles," *Synlett* 5:755-758, 2009.
Office Action for Japanese Patent Application No. 2023-512003, dated Feb. 6, 2024, 8 pages (w/English translation).
Uchida et al., "Preparation and Characterization of (5-Methyl-2-oxo-1,3-dioxol-4-yl) methyl Thiamine Sulfides," *The Pharmaceutical Society of Japan*, 126(3), 179, 2006. (w/English Abstract).
International Search Report and Written Opinion issued for International Application No. PCT/KR2021/011116 on Dec. 1, 2021.
Christ et al., "Rational design of small-molecule inhibitors of the LEDGF/p75-integrase interaction and HIV replication," *Nature Chemical Biology*, vol. 6, pp. 442-448, May 16, 2010.
Office Action for Russian Application No. 2023105729, dated Oct. 11, 2023, with English Translation.

* cited by examiner

*Primary Examiner* — Niloofar Rahmani
(74) *Attorney, Agent, or Firm* — Klarquist Sparkman, LLP

(57) ABSTRACT

The present invention relates to a pyrrolopyridine derivative, a racemate thereof, a stereoisomer thereof, or a pharmaceutically acceptable salt thereof, and use thereof. The compound of the present invention has high selectivity and bioactivity against human immunodeficiency virus (HIV), and low toxicity, thus being useful as a therapeutic agent for viral infection, particularly human immunodeficiency virus (HIV) infection.

7 Claims, No Drawings

PYRROLOPYRIDINE DERIVATIVE AND USE THEREOF

CROSS REFERENCE TO RELATED APPLICATIONS

This is the U.S. National Stage of International Application No. PCT/KR2021/011116, filed Aug. 20, 2021, which in turn claims the benefit of Korean Application No. 10-2020-0104758, filed Aug. 20, 2020, which is incorporated herein in its entirety.

TECHNICAL FIELD

The present disclosure relates to an antiviral compound, particularly a compound having high selectivity and bioactivity against human immunodeficiency virus (HIV) and a use thereof.

BACKGROUND ART

Acquired Immunodeficiency Syndrome (AIDS) is caused by infection with human immunodeficiency virus (HIV). There are two forms of HIV, HIV-1 and HIV-2, wherein HIV-1 is the most prevalent worldwide. For the treatment of AIDS, enzyme inhibitors have been developed according to HIV's mechanism of action. Depending on a point of action, the enzyme inhibitors are classified into a nucleoside reverse transcriptase inhibitor (NRTI), a protease inhibitor (PI), a fusion inhibitor, and an integrase inhibitor.

The integrase inhibitor is divided into a catalytic site inhibitory action and a non-catalytic site inhibitory action according to the mechanism. Research on a catalytic site integrase inhibitor has been actively conducted so far, and three types of this inhibitor drug have been developed and are on the market. Among them, Raltegravir developed in 2008 is a representative drug. On the other hand, the non-catalytic site integrase inhibitory mechanism of action was introduced by Zeger Debyser et al., (Frauke Christ, Zeger Debyser at al., Nature Chemical Biology, 2010, Vol. 6, 442-448), and the development of inhibitors for this mechanism of action has been actively progressing.

Besides, various studies are being conducted to develop drugs to effectively treat viruses with resistance, wherein these therapeutic agents show a great effect of life extension by highly active antiretroviral therapies (HAART) in which 2 to 4 types of drugs inhibiting different mechanisms are administered in combination. However, despite these efforts, AIDS has not been cured, and even toxicity problems of drugs and development of resistance to current therapeutic agents continue to occur. Accordingly, the development of new therapeutic agents is constantly required.

As a part of an effort to solve these problems, the present inventors have repeatedly conducted research for the development of new AIDS therapeutics, and as a result, found that a pyrrolopyridine derivative compound having a new skeleton had an effect of inhibiting the proliferation of HIV, and completed the present invention.

DISCLOSURE

Technical Problem

An object of the present invention is to provide a pyrrolopyridine derivative having an effect of inhibiting the proliferation of HIV-1 by inhibiting an activity of an integrase enzyme of HIV-1, a racemate thereof, a stereoisomer thereof, or a pharmaceutically acceptable salt thereof.

Another object of the present invention is to provide a method of preparing a novel pyrrolopyridine derivative, a racemate thereof, a stereoisomer thereof or a pharmaceutically acceptable salt thereof.

Still another object of the present invention is to provide a medicinal use of the compound.

Technical Solution

In order to achieve the objects, the present inventors have studied and made efforts, and as a result, confirmed that a pyrrolopyridine derivative compound represented by the following Formula I inhibited HIV proliferation, and completed the present invention.

Pyrrolopyridine Derivative Compound

The present invention provides a compound represented by the following Formula I, a racemate thereof, a stereoisomer thereof, or a pharmaceutically acceptable salt thereof:

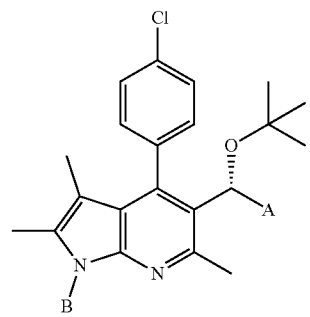

[Formula I]

in Formula above,

A is -hydroxy, -amino, -azido, -cyano, -trifluoromethyl, —$COR_1$, —C=$NOHR_2$, —$B(OH)_2$, —$SO_3H$, —P—O$(OH)_2$ or -heteroaryl;

$R_1$ and $R_2$ are each independently —$NR_3R_4$, —$NR_3OR_4$ or —$OR_5$;

$R_3$ and $R_4$ are each independently -hydrogen, —$C_{1-6}$ alkyl or -heteroaryl;

$R_5$ is —$C_{5-20}$ alkyl, —$(CH_2)$n-O—$(CH_2)$—O—$CH_3$, —$(CH_2)$n-OCOO—$CH_3$, —$(CH)CH_3$—OCOO—$C_{3-6}$ cycloalkyl or —$(CH_2)$n-heteroaryl;

B is —$(CH_2)$n-$R_6$;

$R_6$ is -hydroxy, -amino, -azido, -cyano, -trifluoromethyl, —$C_{2-6}$ alkenyl, —$C_{2-6}$ alkynyl, —$C_{1-6}$ alkoxy, —$CONH(C_{1-3}$ alkyl), —$CON(C_{1-3}$ alkyl), —COOH, —S—($C_{1-6}$ alkyl), —$SO_2$—($C_{1-6}$ alkyl), -carbamoyl, —$C_{3-6}$ cycloalkyl, 4-6 membered heterocycloalkyl, -aryl or -heteroaryl {wherein at least one H of the —$C_{3-6}$ cycloalkyl, 4-6 membered heterocycloalkyl, -aryl or -heteroaryl may be substituted with —$C_{1-6}$ alkyl, —$C_{1-6}$ haloalkyl, —$C_{1-6}$ aminoalkyl, —$C_{1-6}$ hydroxyalkyl, —$C_{1-6}$ alkoxy, -cyano, -carboxy, -amino, -nitro, -azido, -hydroxy, -carbamoyl, -thiol or -halogen}; and n is 1, 2, 3 or 4.

According to an embodiment of the present invention, the compound represented by Formula I, a racemate thereof, a stereoisomer thereof, or a pharmaceutically acceptable salt thereof may be the same as follows.

A is -cyano, —$COR_1$, —C=$NOHR_2$, —$B(OH)_2$, —$SO_3H$, —P=O$(OH)_2$ or -heteroaryl;

R₁ and R₂ are each independently —NR₃R₄, —NR₃OR₄ or —OR₅;

R₃ and R₄ are each independently -hydrogen, —C$_{1-6}$ alkyl or -heteroaryl;

R₅ is —C$_{5-20}$ alkyl, —(CH₂)n-O—(CH₂)—O—CH₃, —(CH₂)n-OCOO—CH₃, —(CH)CH₃—OCOO—C$_{3-6}$ cycloalkyl or —(CH₂)n-heteroaryl;

B is —(CH₂)n-R₆;

R₆ is —C$_{1-6}$ alkoxy, 4-6 membered heterocycloalkyl, —C$_{3-6}$ cycloalkyl, -aryl or -heteroaryl {wherein at least one H of the —C$_{3-6}$ cycloalkyl, 4-6 membered heterocycloalkyl, -aryl or -heteroaryl may be substituted with —C$_{1-6}$ alkyl, —C$_{1-6}$ haloalkyl, —C$_{1-6}$ aminoalkyl, —C$_{1-6}$ hydroxyalkyl, —C$_{1-6}$ alkoxy, -cyano, -carboxy, -amino, -nitro, -azido, -hydroxy, -carbamoyl, -thiol or -halogen}; and n is 1, 2 or 3.

Further, according to an embodiment of the present invention, the compound represented by Formula I, a racemate thereof, a stereoisomer thereof, or a pharmaceutically acceptable salt thereof may be the same as follows.

A is -cyano, —COR₁, —C=NOHR₂ or -heteroaryl;

R₁ and R₂ are each independently —NR₃R₄, —NR₃OR₄ or —OR₅;

R₃ and R₄ are each independently -hydrogen, —C$_{1-6}$ alkyl or -heteroaryl;

R₅ is —C$_{5-20}$ alkyl, —(CH₂)n-O—(CH₂)—O—CH₃, —(CH₂)n-OCOO—CH₃, —(CH)CH₃—OCOO—C$_{3-6}$ cycloalkyl or —(CH₂)n-heteroaryl;

B is —(CH₂)n-R₆;

R₆ is —C$_{1-6}$ alkoxy, 4-6 membered heterocycloalkyl, -aryl or -heteroaryl {wherein at least one H of the 4-6 membered heterocycloalkyl, -aryl or -heteroaryl may be substituted with —C$_{1-6}$ alkyl, —C$_{1-6}$ haloalkyl, —C$_{1-6}$ aminoalkyl, —C$_{1-6}$ hydroxyalkyl, —C$_{1-6}$ alkoxy, -cyano, -carboxy, -amino, -nitro, -azido, -hydroxy, -carbamoyl, -thiol or -halogen}; and n is 1, 2 or 3.

Further, according to an embodiment of the present invention, the compound represented by Formula I, a racemate thereof, a stereoisomer thereof, or a pharmaceutically acceptable salt thereof may be the same as follows.

A is -cyano, —COR₁, —C=NOHR₂ or -heteroaryl;

R₁ is —NR₃R₄, —NR₃OR₄ or —OR₅;

R₂ is —NR₃R₄;

R₃ and R₄ are each independently -hydrogen, —C$_{1-6}$ alkyl or -heteroaryl;

R₅ is —C$_{5-20}$ alkyl, —(CH₂)n-O—(CH₂)—O—CH₃, —(CH₂)n-OCOO—CH₃, —(CH)CH₃—OCOO—C$_{3-6}$ cycloalkyl or —(CH₂)n-heteroaryl;

B is —(CH₂)n-R₆;

R₆ is —C$_{1-6}$ alkoxy, 4-6 membered heterocycloalkyl, -aryl or -heteroaryl {wherein at least one H of the 4-6 membered heterocycloalkyl, -aryl or -heteroaryl may be substituted with —C$_{1-6}$ alkyl or -halogen}; and n is 1 or 2.

Furthermore, the compound represented by Formula I of the present invention may be selected from the group consisting of the following compounds:

1) tridecyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate;

2) (5-methyl-2-oxo-1,3-dioxol-4-yl)methyl (2S)-2-(tert-butoxy)-2-(4-(4-chlorophenyl)-2,3,6-trimethyl-1-(oxetan-2-ylmethyl)-1H-pyrrolo[2,3-b]pyridin-5-yl)acetate;

3) (5-methyl-2-oxo-1,3-dioxol-4-yl)methyl (S)-2-(tert-butoxy)-2-(4-(4-chlorophenyl)-1-(2-methoxyethyl)-2,3,6-trimethyl-1H-pyrrolo[2,3-b]pyridin-5-yl)acetate;

4) (5-methyl-2-oxo-1,3-dioxol-4-yl)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate;

5) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetamide;

6) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetonitrile;

7) (S)-5-(tert-butoxy(1H-tetrazol-5-yl)methyl)-4-(4-chlorophenyl)-2,3,6-trimethyl-1-((1-methyl-1H-pyrazol-4-yl)methyl)-1H-pyrrolo[2,3-b]pyridine;

8) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methylacetamide;

9) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxyacetamide;

10) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxy-N-methylacetamide;

11) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-hydroxyacetamide;

12) (S,Z)-2-(tert-butoxy)-2-(4-(4-chlorophenyl)-2,3,6-trimethyl-1-((1-methyl-1H-pyrazol-4-yl)methyl)-1H-pyrrole[2,3-b]pyridin-5-yl)-N'-hydroxyacetimidamide;

13) (S)-3-(tert-butoxy(4-(4-chlorophenyl)-2,3,6-trimethyl-1-((1-methyl-1-1H-pyrazol-4-yl)methyl)-1H-pyrrolo[2,3-b]pyridin-5-yl)methyl)-5-methyl-1,2,4-oxadiazole;

14) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-(2H-tetrazol-5-yl)acetamide;

15) ((methoxycarbonyl)oxy)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate;

16) 2-(2-methoxyethoxy)ethyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate;

17) 1-(((cyclohexyloxy)carbonyl)oxy)ethyl (2S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate; and 18) (5-methyl-2-oxo-1,3-dioxol-4-yl)methyl (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetate.

The compounds represented by Formula I of the present invention as prepared above may form a salt, particularly a pharmaceutically acceptable salt. Pharmaceutically acceptable suitable salts are those commonly used in the art such as acid addition salts, and are not particularly limited.

Examples of the preferred pharmaceutically acceptable acid addition salt may include inorganic acids such as hydrochloric acid, hydrobromic acid, phosphoric acid, orthophosphoric acid, or sulfuric acid; or organic acids such as methanesulfonic acid, benzenesulfonic acid, toluenesulfonic acid, acetic acid, propionic acid, lactic acid, citric acid, fumaric acid, malic acid, succinic acid, salicylic acid, maleic acid, glycerophosphoric acid, or acetylsalicylic acid.

In addition, a pharmaceutically acceptable metal salt is capable of being obtained by a conventional method using a base. For example, the pharmaceutically acceptable metal salt may be obtained by dissolving the compound represented by Formula I in an excess alkali metal hydroxide or alkaline earth metal hydroxide solution, filtering an undissolved compound salt, and then evaporating and drying the filtrate. A non-pharmaceutically acceptable salt or solvate of the compound represented by Formula I may be used as an intermediate in the preparation of the compound represented by Formula I or a pharmaceutically acceptable salt or solvate thereof.

The compound represented by Formula I of the present invention includes not only the pharmaceutically acceptable salt thereof, but also all possible solvates and hydrates capable of being prepared from the pharmaceutically acceptable salt thereof. Stereoisomers of the compound represented by Formula I and intermediates may be prepared using conventional methods.

In addition, the compound represented by Formula I according to the present invention may be prepared in crystalline or amorphous form, and when the compound represented by Formula I is prepared in a crystalline form, the compound may optionally be hydrated or solvated.

Use of Pyrrolopyridine Derivative Compound

The present invention provides a medicinal use of the compound represented by Formula I, a racemate thereof, a stereoisomer thereof, or a pharmaceutically acceptable salt thereof.

According to embodiments of the present invention, the present invention provides an antiviral pharmaceutical composition comprising the compound represented by Formula I, a racemate thereof, a stereoisomer thereof, or a pharmaceutically acceptable salt thereof as an active ingredient. Specifically, the antiviral composition may be an anti-human immunodeficiency virus (HIV) composition.

In Experimental Example of the present invention, the compound represented by Formula I has excellent HIV inhibitory effect with low cytotoxicity and has various advantages in drug development such as improvement of physicochemical properties as a bioisostere and prodrug, improvement of drug absorption, and regulation of stability and toxicity, and the like.

The composition of the present invention may be formulated as an oral or injectable dosage form. A formulation for oral administration may include, for example, tablets and capsules, and the like, and these formulations contain, in addition to active ingredients, diluents (for example, lactose, dextrose, sucrose, mannitol, sorbitol, cellulose and/or glycine), or lubricants (for example, silica, talc, stearic acid and magnesium calcium salt thereof or polyethylene glycol). The tablet may also contain binders such as magnesium aluminum silicate, starch paste, gelatin, tragacanth, methylcellulose, sodium carboxymethylcellulose or polyvinyl pyrrolidine, and optionally may contain disintegrants such as starch, agar, alginic acid or a sodium salt thereof, or similar mixtures, and/or absorbents, colorants, flavors and sweeteners. As a formulation for injection, an isotonic aqueous solution or suspension is preferred.

The composition may be sterile and/or contain adjuvants such as preservatives, stabilizers, hydrating agents or emulsification accelerators, salts and/or buffers for osmotic pressure control, and other therapeutically useful substances.

The formulation may be prepared by conventional mixing, granulation or coating methods and may contain the active ingredient in an amount of about 0.1 to 75 wt %, preferably about 1 to 50 wt %. A unit dosage form for a mammal of about 50 to 70 kg contains about 10 to 200 mg of active ingredient.

A preferred dosage of the compound of the present invention varies depending on the condition and body weight of the patient, the severity of the disease, the type of drug, the route and duration of administration, but may be appropriately selected by those skilled in the art. The compound of the present invention may be administered via oral or parenteral routes once a day or in divided doses.

The composition of the present invention may be administered to mammals including rats, mice, livestock, and humans, through various routes. All modes of administration may be expected, for example, the composition of the present invention may be administered by oral, rectal or intravenous, intramuscular, subcutaneous, intrauterine dural or intracerebroventricular injection.

Further, according to embodiments of the present invention, the present invention provides a method of preventing or treating a viral infection, particularly HIV infection, comprising administering a therapeutically effective amount of the compound represented by Formula I as described above, a racemate thereof, a stereoisomer thereof, or a pharmaceutically acceptable salt thereof.

Further, according to embodiments of the present invention, the present invention provides use of the compound represented by Formula I as described above, a racemate thereof, a stereoisomer thereof, or a pharmaceutically acceptable salt thereof, for the manufacture of a medicament for the treatment of a viral infection, particularly HIV infection.

Matters described in the use, composition, and treatment method of the present invention are equally applied unless they contradict each other.

Advantageous Effects

The compound of the present invention, a racemate thereof, a stereoisomer thereof, or a pharmaceutically acceptable salt thereof may have high selectivity and bioactivity against viruses, especially, human immunodeficiency virus (HIV), and low toxicity, thus being particularly useful in the treatment of human immunodeficiency virus (HIV) infection.

BEST MODE

Hereinafter, the present invention will be described in more detail by the following Examples and Experimental Examples. However, the following Examples and Experimental Examples are only intended to illustrate the present invention, and the scope of the present invention is not limited only to these Examples.

Example 1: Tridecyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl) acetate Cesium carbonate (112 mg, 0.81 mmol), 1-bromotridecane (128 mg, 0.49 mmol), and dimethylacetamide (1.3 mL) were added to (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.40 mmol), and stirred at 55 to 60° C. for 12 hours. After the reaction was completed, the reaction solution was diluted with ethyl acetate and washed with purified water. The organic layer was dried over anhydrous sodium sulfate, concentrated under reduced pressure, and purified by column chromatography to afford the desired product (255 mg) as a yellow oil.

LC-MS (ESI, m/z)=677.2 (M+H$^+$).

Example 2: (5-Methyl-2-oxo-1,3-dioxol-4-yl)methyl (2S)-2-(tert-butoxy)-2-(4-(4-chlorophenyl)-2,3,6-trimethyl-1-(oxetan-2-ylmethyl)-1H-pyrrolo[2,3-b]pyridin-5-yl)acetate (2S)-2-(tert-butoxy)-2-(4-(4-chlorophenyl)-2,3,6-trimethyl-1-(oxetan-2-ylmethyl)-1H-pyrrolo[2,3-b]pyridin-5-yl) acetic acid (47 mg 0.10 mmol) and 4-(chloromethyl)-5-methyl-1,3-dioxol-2-one (22 mg, 0.15 mmol) were reacted in a similar manner to Example 1 to afford the desired product (20 mg) as an off-white solid.
LC-MS (ESI, m/z)=583.2 (M+H$^+$).

Example 3: (5-Methyl-2-oxo-1,3-dioxol-4-yl)methyl (S)-2-(tert-butoxy)-2-(4-(4-chlorophenyl)-1-(2-methoxyethyl)-2,3,6-trimethyl-1H-pyrrolo[2,3-b]pyridin-5-yl)acetate (S)-2-(tert-butoxy)-2-(4-(4-chlorophenyl)-1-(2-methoxyethyl)-2,3,6-trimethyl-1H-pyrrolo[2,3-b]pyridin-5-yl)acetic acid (342 mg 0.75 mmol) and 4-(chloromethyl)-5-methyl-1,3-dioxol-2-one (184 mg, 1.12 mmol) were reacted in a similar manner to Example 1 to afford the desired product (272 mg) as an off-white solid.
LC-MS (ESI, m/z)=571.1 (M+H$^+$).

Example 4: (5-Methyl-2-oxo-1,3-dioxol-4-yl)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (70 mg, 0.14 mmol) and 4-(chloromethyl)-5-methyl-1,3-dioxol-2-one (34 mg, 0.21 mmol) were reacted in a similar manner to Example 1 to afford the desired product (55 mg) as an off-white solid.
LC-MS (ESI, m/z)=607.2 (M+H$^+$).

Example 5: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetamide Ammonium chloride (32 mg, 0.61 mmol), diisopropylethylamine (157 mg, 1.21 mmol), PyBOP (315 mg, 0.61 mmol), and dimethylformamide (1.3 mL) were added to (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.40 mmol), and stirred at room temperature for 16 hours. After the reaction was completed, the reaction solution was diluted with ethyl acetate and washed with purified water. The organic layer was dried over anhydrous sodium sulfate, concentrated under reduced pressure, and purified by column chromatography to afford the desired product (100 mg) as an off-white solid.
LC-MS (ESI, m/z)=494.2 (M+H$^+$).

Example 6: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetonitrile The compound (100 mg, 0.20 mmol) obtained in Example 5 was dissolved in DCM (0.7 mL), cooled to 0 to 5° C., and triethylamine (31 μL, 0.61 mmol) and TFAA (31 μL, 0.22 mmol) were added, followed by stirring at 0 to 5° C. for 2 hours. After the reaction was completed, the reaction solution was diluted with ethyl acetate and sodium bicarbonate aqueous solution, and the organic layer was extracted and washed with purified water. The organic layer was dried over anhydrous sodium sulfate, concentrated under reduced pressure, and purified by column chromatography to afford the desired product (53 mg) as an off-white solid.
LC-MS (ESI, m/z)=476.2 (M+H$^+$).

Example 7: (S)-5-(tert-butoxy(1H-tetrazol-5-yl)methyl)-4-(4-chlorophenyl)-2,3,6-trimethyl-1-((1-methyl-1H-pyrazol-4-yl)methyl)-1H-pyrrolo[2,3-b]pyridine Sodium azide (10 mg, 0.16 mmol), ammonium hydrochloride (8 mg, 0.16 mmol), and dimethylformamide (0.4 mL) were added to the compound (50 mg, 0.11 mmol) obtained in Example 6, and stirred at 95 to 100° C. for 20 hours. After the reaction was completed, the reaction solution was diluted with ethyl acetate and washed with purified water. The organic layer was dried over anhydrous sodium sulfate, concentrated under reduced pressure, and purified by column chromatography to afford the desired product (21 mg) as an off-white solid.
LC-MS (ESI, m/z)=519.2 (M+H$^+$).

Example 8: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methylacetamide (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.404 mmol) and methylamine hydrochloride (40.9 mg, 0.606 mmol) were reacted in a similar manner to Example 5 to afford the desired product (158 mg) as an off-white solid.
LC-MS (ESI, m/z)=508.1 (M+H$^+$).

Example 9: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxyacetamide (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.404 mmol) and O-methylhydroxyamine hydrochloride (50.6 mg, 0.606 mmol) were reacted in a similar manner to Example 5 to afford the desired product (141.6 mg) as an off-white solid.
LC-MS (ESI, m/z)=524.2 (M+H$^+$).

Example 10: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxy-N-methylacetamide (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.404 mmol) and N,O-dimethylhydroxyamine hydrochloride (59.1 mg, 0.606 mmol) were reacted in a similar manner to Example 5 to afford the desired product (71.2 mg) as an off-white solid.
LC-MS (ESI, m/z)=538.2 (M+H$^+$).

Example 11: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-hydroxyacetamide (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (300 mg, 0.606 mmol) and hydroxyamine hydrochloride (473 mg, 0.909 mmol) were reacted in a similar manner to Example 5 to afford the desired product (100 mg) as an off-white solid.

LC-MS (ESI, m/z)=510.1 (M+H$^+$).

Example 12: (S,Z)-2-(tert-butoxy)-2-(4-(4-chlorophenyl)-2,3,6-trimethyl-1-((1-methyl-1H-pyrazol-4-yl)methyl)-1H-pyrrole[2,3-b]pyridin-5-yl)-N'-hydroxyacetimidamide To the compound (413 mg, 0.87 mmol) obtained in Example 6, hydroxylamine hydrochloride (121 mg, 1.74 mmol), sodium hydrogen carbonate (146 mg, 1.74 mmol), and ethanol (4.3 mL) were added and stirred for 4 hours at 80° C. After the reaction was completed, the reaction solution was diluted with ethyl acetate and washed with purified water. The organic layer was dried over anhydrous sodium sulfate, concentrated under reduced pressure, and purified by column chromatography to afford the desired product (390 mg) as an off-white solid.

LC-MS (ESI, m/z)=509.3 (M+H$^+$).

Example 13: (S)-3-(tert-butoxy (4-(4-chlorophenyl)-2,3,6-trimethyl-1-((1-methyl-1-1H-pyrazol-4-yl)methyl)-1H-pyrrolo[2,3-b]pyridin-5-yl)methyl)-5-methyl-1,2,4-oxadiazole To the compound (325 mg, 0.64 mmol) obtained in Example 12, p-toluenesulfonic acid hydrate (36 mg, 0.19 mmol), zinc chloride (26 mg, 0.19 mmol), and acetonitrile (2.1 mL) were added and stirred for 3 hours at 80° C. After the reaction was completed, the reaction solution was diluted with ethyl acetate and washed with purified water. The organic layer was dried over anhydrous sodium sulfate, concentrated under reduced pressure, and purified by column chromatography to afford the desired product (9 mg) as an off-white solid.

LC-MS (ESI, m/z)=533.3 (M+H$^+$).

Example 14: (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-(2H-tetrazol-5-yl)acetamide (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.404 mmol) and 5-amino-1H-tetrazole (51.6 mg, 0.606 mmol) were reacted in the same manner as in Example 5 to afford the desired product (83.5 mg) as an off-white solid.

LC-MS (ESI, m/z)=562.1 (M+H$^+$).

Example 15: ((Methoxycarbonyl)oxy)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (300 mg, 0.606 mmol) was diluted in DMF (1.21 mL), then chloromethyl methyl carbonate (113 mg, 0.909 mmol) and cesium carbonate (592 mg, 1.818 mmol) were added, and the mixture was stirred at room temperature for 22 hours. After the reaction was completed, the reaction solution was diluted with ethyl acetate and washed with purified water. The organic layer was dried over anhydrous sodium sulfate, concentrated under reduced pressure, and purified by column chromatography to afford the desired product (316 mg) as an off-white solid.

LC-MS (ESI, m/z)=583.1 (M+H$^+$).

Example 16: 2-(2-Methoxyethoxy)ethyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (200 mg, 0.404 mmol) and 1-bromo-2-(2-methoxyethoxy)ethane (123 mg, 0.606 mmol) were reacted in the same manner as in Example 15 to afford the desired product (118.6 mg) as an off-white solid.

LC-MS (ESI, m/z)=597.2 (M+H$^+$).

Example 17: 1-(((Cyclohexyloxy)carbonyl)oxy)ethyl (2S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetic acid (700 mg, 2.121 mmol) and 1-chloroethyl cyclohexyl carbonate (438 mg, 2.121 mmol) were reacted in the same manner as in Example 15 to afford the desired product (912 mg) as a pale yellow solid.

LC-MS (ESI, m/z)=665.2 (M+H$^+$).

Example 18: (5-Methyl-2-oxo-1,3-dioxol-4-yl)methyl (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetate

[Step 1] Preparation of methyl (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetate Methyl (S)-2-(tert-butoxy)-2-(4-(4-chlorophenyl)-2,3,6-trimethyl-1H-pyrrolo[2,3-b]pyridin-5-yl)acetate (150 mg, 0.362 mmol), 4-(bromomethyl)-1,2-difluorobenzene (374 mg, 1.808 mmol), potassium hydroxide (50.7 mg, 0.904 mmol), and TBAB (11.65 mg, 0.036 mmol) were diluted in DCM (3.23 mL) and stirred for 5 hours at room temperature. After the reaction was completed, the reaction solution was diluted with ethyl acetate and washed with purified water. The organic layer was dried over anhydrous sodium sulfate, concentrated under reduced pressure, and purified by column chromatography to afford the desired product (122 mg) as a pale yellow solid.

LC-MS (ESI, m/z)=541.1 (M+H$^+$).

[Step 2] Preparation of (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetic acid The compound (122 mg, 0.225 mmol) obtained in step 1 was dissolved in a mixture of THF:MeOH (1:1), then NaOH (27.1 mg, 0.676 mmol) was added, and the mixture was stirred at 40° C. for 13 hours. After the reaction was completed, the reaction solution was diluted with ethyl acetate and washed with purified water. The organic layer was dried over anhydrous sodium sulfate, concentrated under reduced pressure, and purified by column chromatography to afford the desired product (89.5 mg) as an off-white solid.

LC-MS (ESI, m/z)=527.2 (M+H$^+$).

[Step 3] Preparation of (5-methyl-2-oxo-1,3-dioxol-4-yl)methyl (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetate The compound (20 mg, 0.038 mmol) obtained in step 2 and 4-(chloromethyl)-5-methyl-1,3-dioxol-2-one (9 mg, 0.057 mmol) were prepared in a similar manner to Example 15 to afford the desired product (3.1 mg) as a pale yellow solid.

LC-MS (ESI, m/z)=639.1 (M+H$^+$).

Experimental Example 1: Study of HIV-1 (Wild Type) Inhibitory Effect and Cytotoxicity Test of Compounds of the Present Invention In order to determine the HIV-1 (Wild type) inhibitory effect of compounds of the present invention, a test was conducted as follows. The host cell was MT-4 cells and the virus strain was NL4-3 strain of HIV-1. The virus and cells were mixed in the presence of the compounds of the present invention, followed by incubation for 6 days. The antiviral effect was measured as a percentage decrease in viral cytopathic effect (CPE), and the cytotoxicity of the compounds was evaluated by MTS (CellTiter® 96 Reagent, Promega, Madison WI) dye reduction assay. Results thereof are shown in TABLE. 1.

| Example No. | HIV-1(NL4-3) in MT-4 Cells | |
|---|---|---|
| | EC$_{50}$(nM) | CC$_{50}$(μM) |
| 1 | >10.00 | >10 |
| 2 | 120.05 | >10 |
| 3 | 22.7 | >10 |
| 4 | 5.27 | >10 |
| 5 | >10.0 | >10 |
| 6 | >10.0 | >10 |
| 7 | 361 | >10 |
| 8 | N/A | 4.98 |
| 9 | N/A | 8.89 |
| 10 | >10.00 | >10 |
| 11 | N/A | 3.16 |
| 12 | >10.00 | >10 |
| 13 | >10.00 | >10 |
| 14 | >10.00 | >10 |
| 15 | 31.6 | >10 |
| 16 | >10.00 | >10 |

Specific parts of the present invention have been described in detail. It will be obvious to those skilled in the art that these specific descriptions are merely preferred embodiments, and the scope of the present invention is not limited thereby. Therefore, the substantial scope of the present invention will be defined by the attached claims and equivalents thereof.

The invention claimed is:
1. A compound represented by the following Formula I, a racemate thereof, a stereoisomer thereof, or a pharmaceutically acceptable salt thereof:

[Formula I]

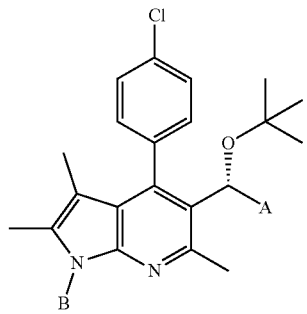

in Formula above,
A is -hydroxy, -amino, -azido, -cyano, -trifluoromethyl, —COR$_1$, —C=NOHR$_2$, —B(OH)$_2$, —SO$_3$H, —P=O(OH)$_2$ or -heteroaryl;
R$_1$ and R$_2$ are each independently —NR$_3$R$_4$, —NR$_3$OR$_4$ or —OR$_5$;
R$_3$ and R$_4$ are each independently -hydrogen, —C$_{1-6}$ alkyl or -heteroaryl;
R$_5$ is —(CH$_2$)n-O—(CH$_2$)—O—CH$_3$, —(CH$_2$)n-OCOO—CH$_3$, —(CH)CH$_3$—OCOO—C$_{3-6}$ cycloalkyl or (CH$_2$)n-heteroaryl;
B is —(CH$_2$)n-R$_6$;
R$_6$ is -hydroxy, -amino, -azido, -cyano, -trifluoromethyl, —C$_{2-6}$ alkenyl, —C$_{2-6}$ alkynyl, —C$_{1-6}$ alkoxy, —CONH(C$_{1-3}$ alkyl), —CON(C$_{1-3}$ alkyl)$_2$, —COOH, —S—(C$_{1-6}$ alkyl), —SO$_2$—(C$_{1-6}$ alkyl), -carbamoyl, —C$_{3-6}$ cycloalkyl, 4-6 membered heterocycloalkyl, -aryl or -heteroaryl {wherein at least one H of the —C$_{3-6}$ cycloalkyl, 4-6 membered heterocycloalkyl, -aryl or -heteroaryl may be substituted with —C$_{1-6}$ alkyl, —C$_{1-6}$ haloalkyl, —C$_{1-6}$ aminoalkyl, —C$_{1-6}$ hydroxyalkyl, —C$_{1-6}$ alkoxy, -cyano, -carboxy, -amino, -nitro, -azido, -hydroxy, -carbamoyl, -thiol or -halogen}; and
n is 1, 2, 3 or 4.

2. The compound represented by Formula I, the racemate thereof, the stereoisomer thereof or the pharmaceutically acceptable salt thereof according to claim 1, wherein
A is -cyano, —COR$_1$, —C=NOHR$_2$, —B(OH)$_2$, —SO$_3$H, —P=O(OH)$_2$ or -heteroaryl;
R$_1$ and R$_2$ are each independently —NR$_3$R$_4$, —NR$_3$OR$_4$ or —OR$_5$;
R$_3$ and R$_4$ are each independently -hydrogen, —C$_{1-6}$ alkyl or -heteroaryl;
R$_5$ is —(CH$_2$)n-O—(CH$_2$)—O—CH$_3$, —(CH$_2$)n-OCOO—CH$_3$, —(CH)CH$_3$—OCOO—C$_{3-6}$ cycloalkyl or (CH$_2$)n-heteroaryl;
B is —(CH$_2$)n-R$_6$;
R$_6$ is —C$_{1-6}$ alkoxy, 4-6 membered heterocycloalkyl, —C$_{3-6}$ cycloalkyl, -aryl or -heteroaryl {wherein at least one H of the —C$_{3-6}$ cycloalkyl, 4-6 membered heterocycloalkyl, -aryl or -heteroaryl may be substituted with —C$_{1-6}$ alkyl, —C$_{1-6}$ haloalkyl, —C$_{1-6}$ aminoalkyl, —C$_{1-6}$ hydroxyalkyl, —C$_{1-6}$ alkoxy, -cyano, -carboxy, -amino, -nitro, -azido, -hydroxy, -carbamoyl, -thiol or -halogen}; and
n is 1, 2 or 3.

3. The compound represented by Formula I, the racemate thereof, the stereoisomer thereof or the pharmaceutically acceptable salt thereof according to claim 1, wherein A is -cyano, —$COR_1$, —C=$NOHR_2$ or -heteroaryl;
$R_1$ and $R_2$ are each independently —$NR_3R_4$, —$NR_3OR_4$ or —$OR_5$;
$R_3$ and $R_4$ are each independently -hydrogen, —$C_{1-6}$ alkyl or -heteroaryl;
$R_5$ is —$(CH_2)$n-O—$(CH_2)$—O—$CH_3$, —$(CH_2)$n-OCOO—$CH_3$, —(CH)$CH_3$—OCOO—$C_{3-6}$ cycloalkyl or —$(CH_2)$n-heteroaryl;
B is —$(CH_2)$n-$R_6$;
$R_6$ is —$C_{1-6}$ alkoxy, 4-6 membered heterocycloalkyl, -aryl or -heteroaryl {wherein at least one H of the 4-6 membered heterocycloalkyl, -aryl or -heteroaryl may be substituted with —$C_{1-6}$ alkyl, —$C_{1-6}$ haloalkyl, —$C_{1-6}$ aminoalkyl, —$C_{1-6}$ hydroxyalkyl, —$C_{1-6}$ alkoxy, -cyano, -carboxy, -amino, -nitro, -azido, -hydroxy, -carbamoyl, -thiol or -halogen}; and
n is 1, 2 or 3.

4. The compound represented by Formula I, the racemate thereof, the stereoisomer thereof or the pharmaceutically acceptable salt thereof according to claim 1, wherein A is -cyano, —$COR_1$, —C=$NOHR_2$ or -heteroaryl;
$R_1$ is —$NR_3R_4$, —$NR_3OR_4$ or —$OR_5$;
$R_2$ is —$NR_3R_4$;
$R_3$ and $R_4$ are each independently -hydrogen, —$C_{1-6}$ alkyl or -heteroaryl;
$R_5$ is —$(CH_2)$n-O—$(CH_2)$—O—$CH_3$, —$(CH_2)$n-OCOO—$CH_3$, —(CH)$CH_3$—OCOO—$C_{3-6}$ cycloalkyl or —$(CH_2)$n-heteroaryl;
B is —$(CH_2)$n-$R_6$;
$R_6$ is —$C_{1-6}$ alkoxy, 4-6 membered heterocycloalkyl, -aryl or -heteroaryl {wherein at least one H of the 4-6 membered heterocycloalkyl, -aryl or -heteroaryl may be substituted with —$C_{1-6}$ alkyl or -halogen}; and
n is 1 or 2.

5. The compound represented by Formula I, the racemate thereof, the stereoisomer thereof or the pharmaceutically acceptable salt thereof according to claim 1, wherein the compound is selected from the following Formulas:

2) (5-methyl-2-oxo-1,3-dioxol-4-yl)methyl (2S)-2-(tert-butoxy)-2-(4-(4-chlorophenyl)-2,3,6-trimethyl-1-(oxetan-2-ylmethyl)-1H-pyrrolo[2,3-b]pyridin-5-yl) acetate;
3) (5-methyl-2-oxo-1,3-dioxol-4-yl)methyl (S)-2-(tert-butoxy)-2-(4-(4-chlorophenyl)-1-(2-methoxyethyl)-2,3,6-trimethyl-1H-pyrrolo[2,3-b]pyridin-5-yl)acetate;
4) (5-methyl-2-oxo-1,3-dioxol-4-yl)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate;
5) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetamide;
6) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl) acetonitrile;
7) (S)-5-(tert-butoxy (1H-tetrazol-5-yl)methyl)-4-(4-chlorophenyl)-2,3,6-trimethyl-1-((1-methyl-1H-pyrazol-4-yl)methyl)-1H-pyrrolo[2,3-b]pyridine;
8) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methylacetamide;
9) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxyacetamide;
10) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-methoxy-N-methylacetamide;
11) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-hydroxyacetamide;
12) (S,Z)-2-(tert-butoxy)-2-(4-(4-chlorophenyl)-2,3,6-trimethyl-1-((1-methyl-1H-pyrazol-4-yl)methyl)-1H-pyrrole[2,3-b]pyridin-5-yl)-N'-hydroxyacetimidamide;
13) (S)-3-(tert-butoxy (4-(4-chlorophenyl)-2,3,6-trimethyl-1-((1-methyl-1-1H-pyrazol-4-yl)methyl)-1H-pyrrolo[2,3-b]pyridin-5-yl)methyl)-5-methyl-1,2,4-oxadiazole;
14) (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)-N-(2H-tetrazol-5-yl)acetamide;
15) ((methoxycarbonyl)oxy)methyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl) acetate;
16) 2-(2-methoxyethoxy)ethyl (S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl) acetate;
17) 1-(((cyclohexyloxy)carbonyl)oxy)ethyl (2S)-2-(tert-butoxy)-2-(4-(4-chlorophenyl)-2,3,6-trimethyl-1-((1-methyl-1H-pyrazol-4-yl)methyl)-1H-pyrrolo[2,3-b]pyridin-5-yl)acetate; or
18) (5-methyl-2-oxo-1,3-dioxol-4-yl)methyl (S)-2-(tert-butoxy)-2-(4-(4-chlorophenyl)-1-(3,4-difluorobenzyl)-2,3,6-trimethyl-1H-pyrrolo[2,3-b]pyridin-5-yl)acetate.

6. An anti-human immunodeficiency virus (HIV) pharmaceutical composition comprising the compound represented by Formula I according to claim 1, the racemate thereof, the stereoisomer thereof, or the pharmaceutically acceptable salt thereof as an active ingredient.

7. A method of treating an anti-human immunodeficiency virus (HIV) comprising administering a therapeutically effective amount of the compound represented by Formula I according to claim 1, the racemate thereof, the stereoisomer thereof, or the pharmaceutically acceptable salt thereof.

* * * * *